(12) United States Patent
Bifulco

(10) Patent No.: US 7,682,227 B1
(45) Date of Patent: Mar. 23, 2010

(54) MEAT CUTTING ASSEMBLY

(76) Inventor: Phil Bifulco, 5829 NW. 85 La., Parkland, FL (US) 33067

( * ) Notice: Subject to any disclaimer, the term of this patent is extended or adjusted under 35 U.S.C. 154(b) by 0 days.

(21) Appl. No.: 12/459,889

(22) Filed: Jul. 9, 2009

(51) Int. Cl.
*A22C 9/00* (2006.01)
(52) U.S. Cl. .................................................. 452/141
(58) Field of Classification Search ......... 452/141–144, 452/149–153, 160–162
See application file for complete search history.

(56) References Cited

U.S. PATENT DOCUMENTS

| | | | | | |
|---|---|---|---|---|---|
| 2,051,207 | A | * | 8/1936 | Ferry | 452/142 |
| 2,380,371 | A | * | 7/1945 | Spang | 452/142 |
| 3,222,712 | A | * | 12/1965 | Deckert | 452/142 |
| 3,222,713 | A | * | 12/1965 | Stein et al. | 452/142 |
| 3,786,536 | A | * | 1/1974 | Deckert | 452/141 |

* cited by examiner

*Primary Examiner*—Thomas Price
(74) *Attorney, Agent, or Firm*—Malloy & Malloy, P.A.

(57) ABSTRACT

A cutting assembly for cutting a meat or food product passing along a path of travel and comprising a blade roller having a plurality of blades transversely connected thereto in aligned relation to the path of travel. A mate roller, an in-feed roller and an out-feed roller interact with the plurality of blades to assure removal of meat portions from the blade and mate rollers during the cutting procedure. The mate roller comprises a plurality of mate roller sections each separated from one another by a first predetermined space and variably or adjustably positioned along the length of the mate roller by interaction with a stabilizing assembly to accommodate receipt of the blades within the first predetermined spaces during concurrent rotation of the blade and mate rollers. The cutting assembly may include a modular construction disposable within and removable from an operative position along a processing line associated with the path of travel.

32 Claims, 13 Drawing Sheets

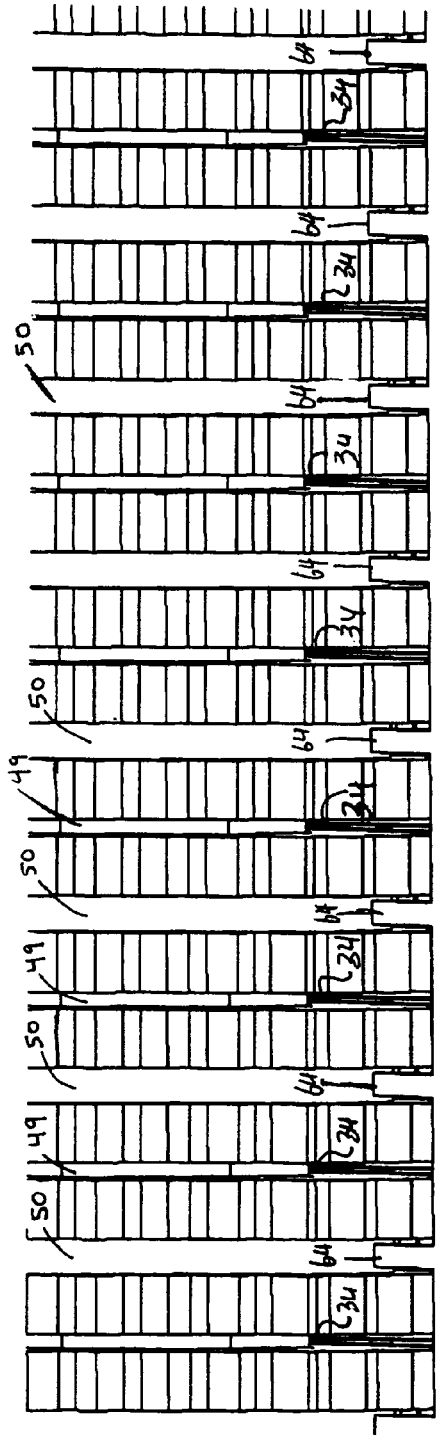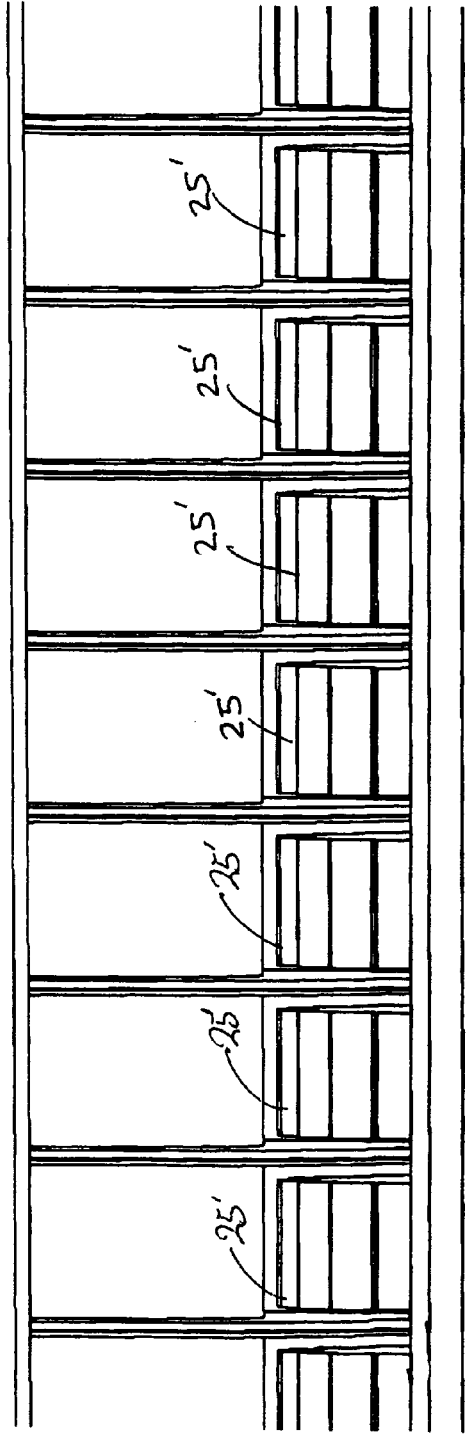
Fig 8

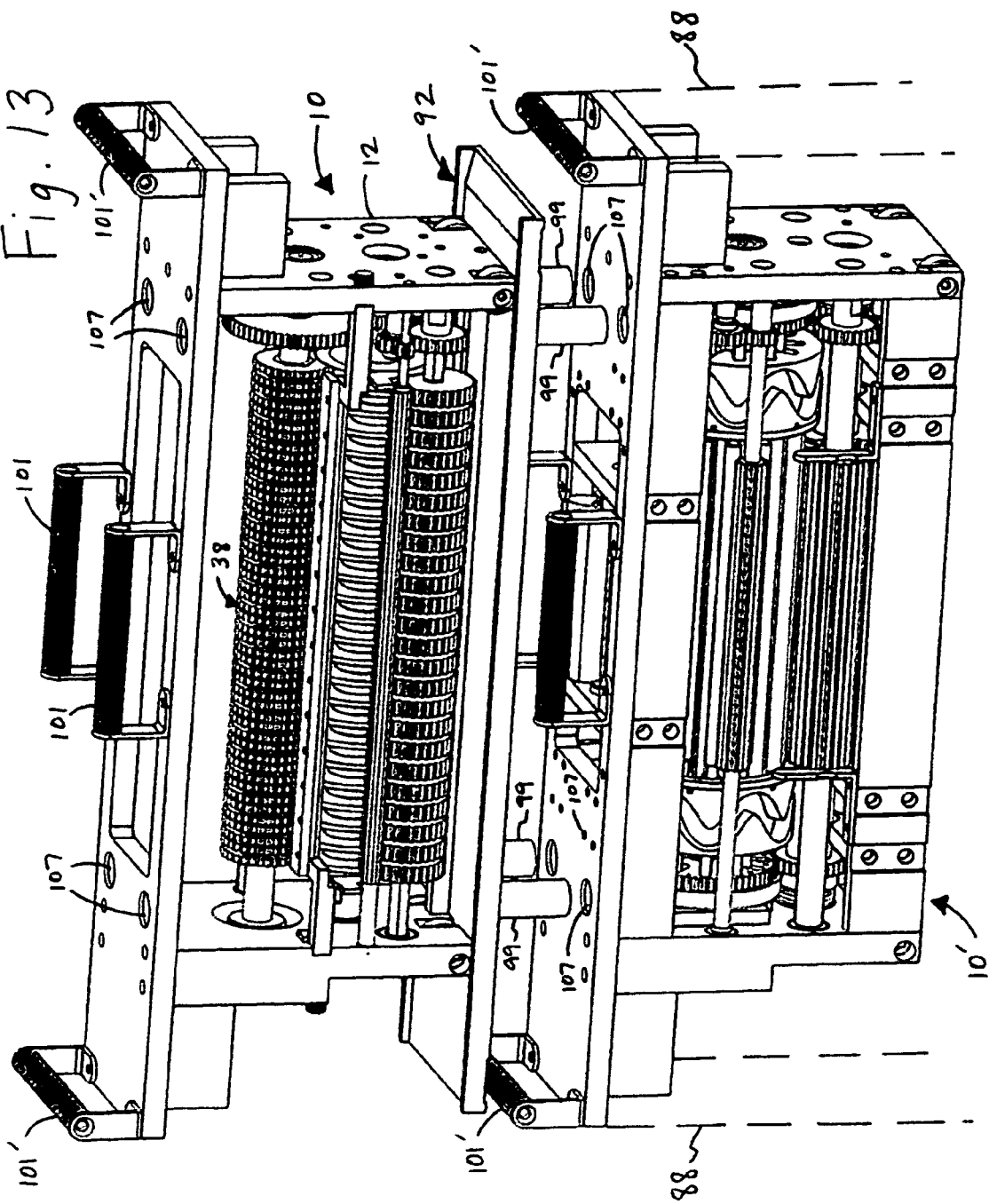

MEAT CUTTING ASSEMBLY

BACKGROUND OF THE INVENTION

1. Field of the Invention

This invention relates to a cutting assembly for meat or other appropriate food products passing along a path of travel and comprises a modular cutting unit capable of being added to or removed from a processing line. The modular cutting assembly includes a blade assembly and a mate assembly which interact to consistently cut the meat in the intended manner. Input and output assemblies are respectively disposed adjacent the entrance and exit areas of the path of travel and serve to accurately direct the meat there along while facilitating removal of meat portions from between the plurality of blades of the blade assembly during and after the cutting procedure.

2. Description of the Related Art

For many years, the food industry has relied on manual cutting for the cutting and other processing of meat products, wherein a larger piece of meat was reduced to smaller pieces of various sizes and configurations dependent, at least in part, on the intended use of such reduced meat portions. However, it is well recognized that such manual cutting and other processing is time consuming, labor intensive and lacks consistency in the size, shape, etc. of the final product.

Such inconsistencies are particularly common to smaller pieces or chunks of meat products when cut from a larger meat portion, wherein the smaller, typically cube-like pieces are used for different applications. Despite the recognized skill and experience of butchers and like processing personnel, there is still an overall lack of consistency in terms of size, weight, and other characteristics of the smaller meat portions. In addition to the disadvantages and problems, as generally set forth above, butchers and other personnel utilizing manual cutting techniques necessarily handle the food product extensively. These procedures frequently result in sanitation problems and at least some dangers to the processing personnel.

In order to overcome problems of the type set forth above, attempts have been made to create automated meat cutting and/or processing systems which are structured to perform cutting as well as a variety of other processing features. While some of these automatic machines and/or systems are considered to be at least minimally operative for their intended purpose, consistency problems still exist in terms of the size, weight, shape, cut characteristics, etc. Included in the aforementioned problems associated with known automated machines is the difficulty of cutting through heavy gristle and/or like muscle membrane. This difficulty frequently results in the processed pieces or portions still remaining attached by virtue of the failure to cut completely through existing gristle, etc. While many of the disadvantages associated with manual processing have been alleviated by conventional automated processing equipment, problems still remain. Such problems relate to the efficiency and reliability of the conventional automated, equipment and the ability to achieve the desired consistency in the final product.

Therefore, there is a long recognized need in the food processing industry and more specifically in the area of meat cutting and processing for an efficient and effective automated cutting assembly. Such an improved cutting assembly should be capable of accurately cutting meat into the desired shapes and sizes on a consistent basis, while eliminating the above noted disadvantages associated with manual processing. Further, an improved and proposed cutting assembly should be structured so as to reliably and efficiently cut through heavy gristle, muscle membrane, etc., thereby eliminating or significantly reducing the problems and/or disadvantages commonly associated with known or conventional automatic cutting assemblies. Further, an improved and proposed meat cutting assembly should be capable of timely processing large quantities of meat and other appropriate food products such as by passing the product along a defined path of travel. Moreover, the structuring of such an improved cutting assembly as a modular cutting unit would increase its versatility by allowing it to be an operative component of a more extensive processing line, where other processing steps may be performed on the product.

In addition, a preferred and proposed meat cutting assembly could be automated while being constructed into the aforementioned modular unit, thereby facilitating its placement or removal into and out of an operative position along a more extensive processing line comprised of other operative components. The meat cutting assembly as proposed and improved should also include various self-contained operative features including a blade assembly and mate assembly cooperatively disposed along the path of travel relative to input and output assemblies. Accordingly, the meat being cut is directed to and from the interactive blade and mate assemblies in a manner that assures that portions of the meat are prevented from collecting between the blades of the blade assembly before or concurrently to passing along the path of travel and beyond the out-feed assembly.

Finally, such a proposed and improved meat cutting assembly should include an overall design and structure which enables a continued functioning of the cutting assembly even under relatively harsh operating conditions.

SUMMARY OF THE INVENTION

The present invention is directed to an assembly for cutting meat or other appropriate food products while the products pass along a predetermined path of travel. At least one preferred embodiment of the cutting assembly of the present invention includes the structuring thereof into a substantially modular cutting unit. As such the cutting assembly may be disposed in and removed from a predetermined operative position along a processing line communicating with the path of travel of the modular cutting unit. The various components of the cutting assembly at least partially define the path of travel in that meat products being cut pass continuously through the cutting assembly and may be further processed by other portions or modular components along the processing line.

More specifically, the cutting assembly of the present invention includes a blade assembly and an interactive mate assembly. The blade assembly includes at least one blade roller having a plurality of spaced apart blades connected to the blade roller so as to rotate therewith. The plurality of blades are connected in a transverse orientation relative to the length of the blade roller and as such are substantially aligned with the direction of travel of the meat product being cut as it moves along the path of travel. Accordingly, the transverse orientation of the plurality of the blades relative to the blade roller and the alignment thereof with the path of travel, serve to cut the meat product into a plurality of strips, as will be more apparent.

The aforementioned mate assembly includes at least one mate roller which is disposed and structured to substantially interact with the one blade roller and more specifically with the plurality of the blades connected to the blade roller. In addition, the at least one mate roller is disposed in engaging relation to the meat product passing along the path of travel and concurrently engages the meat product with the blade roller and the plurality of blades associated therewith. Therefore, as the meat product travels along the path of travel its position between the blade roller and the mate roller is substantially stabilized allowing for sufficiently precise and accurate cutting thereof.

The mate roller further comprises a plurality of mate roller sections disposed in predetermined spaced relation to one another as they collectively extend in transverse relation to and along the length of the mate roller. More specifically, each of the plurality of mate roller sections is separated from one another, along the length of the mate roller, by a "first predetermined space". Further each of the mate roller sections comprise two mate segments which may be fixedly connected to one another and separated by a "second predetermined space" along the length of the mate roller. In at least one preferred embodiment, the second predetermined space is greater than the first predetermine space, as will be explained in greater detail hereinafter.

Moreover, the first predetermined space comprises at least a minimally greater transverse dimension than a thickness of a correspondingly disposed one of the plurality of blades. This cooperative dimensioning of the first predetermined space and corresponding ones of the blades allow each of the blades to occupy and pass through the corresponding first predetermined space which separates two adjacent and correspondingly positioned mate roller sections, during concurrent rotation of the blade roller and the mate roller. As a result, portions of the meat being cut will be prevented from clinging to the blades. Moreover, the small transverse dimension of the first predetermined space and the fact that they are substantially occupied by the blades restricts entry of the meat being cut into the first predetermined spaces.

The cutting assembly of the present invention further includes an "in-feed" assembly and an "out-feed" assembly disposed transversely across the path of travel in spaced relation to one another. Further, the in-feed and out-feed assemblies are respectively disposed adjacent an entrance and exit of the path of travel and thereby facilitate the respective delivery and removal of the meat being cut relative to the blade roller and the mate roller. In addition, the out-feed assembly comprises an out-feed roller including a plurality of out-feed roller sections connected thereto and rotational therewith. The out-feed roller sections are disposed in interacting, extracting or meat clearing relation to said plurality of blades. Moreover, the plurality of out-feed roller sections are rotationally disposed between corresponding, adjacently disposed ones of the plurality of blades, when both the blade roller and the out-feed roller concurrently rotate as the meat product passes along the path of travel. Further, the plurality of out-feed roller sections are transversely oriented in spaced relation to one another and in off-set relation to the plurality of blades. This predetermined, cooperative disposition of the out-feed roller sections and the plurality of blades allows for the ejecting or meat clearing disposition of the out-feed roller sections between the blades during concurrent rotation of the blade roller and out-feed roller. As a result portions of the meat are prevented from being stuck between the blades and rotating with the blade roller beyond the out-feed roller.

Additional structural features include the provision of a stabilizing assembly. The stabilizing assembly preferably includes an elongated base fixedly disposed in transverse relation to the path of travel. Further, the fixed base of the stabilizing assembly includes a plurality of fingers or prongs extending outwardly from the base. The prongs are disposed in spaced relation to one another a sufficient distance to extend into correspondingly disposed ones of the aforementioned second predetermined spaces which separates the two mate segments of each of the mate roller sections. Accordingly, the interaction between the prongs of the stabilizing assembly and the mate roller prevents the meat from adhering to the mate roller such as by being stuck between the two mate segments of each of the mate roller sections. In addition, in at least one preferred embodiment of the cutting assembly comprises the mate roller sections being attached to the mate roller in a manner that permits at least minimal longitudinal movement or displacement thereof along the length of the mate roller, while maintaining a concurrent rotation of the mate roller sections with the mate roller. Accordingly, the proper and intended longitudinal positioning of the mate roller sections on the mate roller, so as to align the first predetermined spaces there between with corresponding ones of the cutting blades, is due at least in part to the disposition of the fixed prongs of the stabilizing assembly being disposed within the second predetermined spaces and the resulting interaction of the stabilizing assembly with the mate roller assembly. Moreover, the non-fixed, but still limited, positioning of the plurality of mate roller sections along the length of the mate roller allows for at least a minimal variance in the size of the first predetermined spaces. In turn, this minimal size variance provides an appropriate tolerance between the position of the blades and the position of the corresponding mate roller sections, as the blades rotate within the first predetermined spaces and interact with the mate roller.

The in-feed roller assembly is similarly structured to the out-feed roller assembly in that it includes an in-feed roller comprising a plurality of in-feed roller sections. As with the out-feed roller, the plurality of in-feed roller sections are also disposed to restrict meat from clinging to the blades or passing there between. Therefore, each of the in-feed roller sections is cooperatively disposed and dimensioned with the plurality of blades so as to pass between adjacent ones of correspondingly positioned blades, as the in-feed roller and the blade roller concurrently rotate. This interaction facilitates an accurate, stable feeding and placement of the meat product being cut as it passes along the path of the travel into and between the blade roller and the mate roller while prohibiting or significantly reducing the possibility of meat adhering to the blade roller.

Further the preferred positioning of the meat may be maintained as it passes along the path of travel by regulating the relative speed of the blade roller and mate roller. In at least one preferred embodiment, the rotational speed of the blade roller is substantially four times greater than that of the mate roller. Such a speed differential between the blade and the mate rollers facilitates a consistent cut of the meat product as it passes between the in-feed assembly and the out-feed assembly and concurrently through the interactive blade roller and mate roller.

As indicated above, at least one embodiment of the present invention comprises the cutting assembly being in the form of a modular cutting unit and as such being an operable component of a processing line. Accordingly, the meat product may pass along the processing line to or from the meat cutting assembly of the present invention for additional processing such as cutting, packaging, dispensing, etc. Also, when in the form of the modular cutting unit, the versatility of the cutting assembly may be enhanced by facilitating the insertion and/or removal thereof into an operative position along the processing line. Accordingly, the path of travel through the modular cutting unit at least partially defines a portion of the processing line which may extend upstream and/or downstream of the modular cutting unit. As will be apparent, the processing line, as referred to herein, may comprise a number of assemblies and/or processing equipment intended to perform further processing of the meat or other food product being cut. Such additional processing steps may vary dependent at least in part on the meat or other product being processed and its intended use. Accordingly, the modular cutting unit of the cutting assembly of the present invention may be considered an operative component of the processing line.

Accordingly, the modular construction of the meat cutting assembly includes a housing or frame disposed in surrounding, containing and/or supporting relation to the various operative components of the cutting assembly, set forth above. The frame serves as a containing structure facilitating the insertion, removal and transport of the entire cutting assembly of the present invention. Therefore, in general terms the various operative components including the blade assembly, in-feed assembly, out-feed assembly, mate assembly, stabilizing assembly, etc, are all operatively contained on or within the housing or frame and are therefore considered a part of the modular cutting unit construction of the cutting assembly of at least one preferred embodiment of the present invention.

In order to facilitate placement of the cutting assembly in and removal from its intended operative position in the processing line, at least one preferred embodiment of the present invention includes a delivery assembly preferably in the form of a support platform. The support platform facilitates transport and positioning of the modular cutting unit as it is installed within its intended operative position along the processing line. Such a support platform may have an elongated construction and be generally dimensioned and configured to support the entire modular cutting unit thereon. In addition, the frame of the modular cutting unit includes a wheel assembly including a plurality of wheels, rollers or other structures which facilitates movement and/or intended positioning and orientation of the modular cutting unit on an outer supporting surface of the support platform. When so positioned the modular cutting unit may be efficiently and effectively oriented relative to its operative position along the processing line.

To this end, the frame or housing of the modular cutting unit also includes a handle assembly preferably including a plurality of handles specifically disposed in an accessible location so as to facilitate the lifting, carrying or other positioning thereof in different orientations, as it is being positioned for placement within and removal from its operative position within the processing line. Further, the handle assembly and the various handle structures associated therewith facilitate the handling by a minimal number of workers, wherein the modular cutting unit may be carried, lifted, supported, oriented and/or selectively positioned from either the same side of the processing line or opposite sides thereof.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 8 is a detail view in partial cutaway of a stabilization assembly associated with at least one preferred embodiment of the present invention and its interactive relation with the mate roller of the mate roller assembly.

FIG. 13 is a perspective view similar to the embodiment of FIG. 12 wherein the modular cutting unit and delivery assembly are supported in a stacked orientation on an upper portion of another modular cutting unit already installed within the processing line of FIG. 10.

Like reference numerals refer to like parts throughout the several views of the drawings.

DETAILED DESCRIPTION OF THE PREFERRED EMBODIMENT

Figure 10:
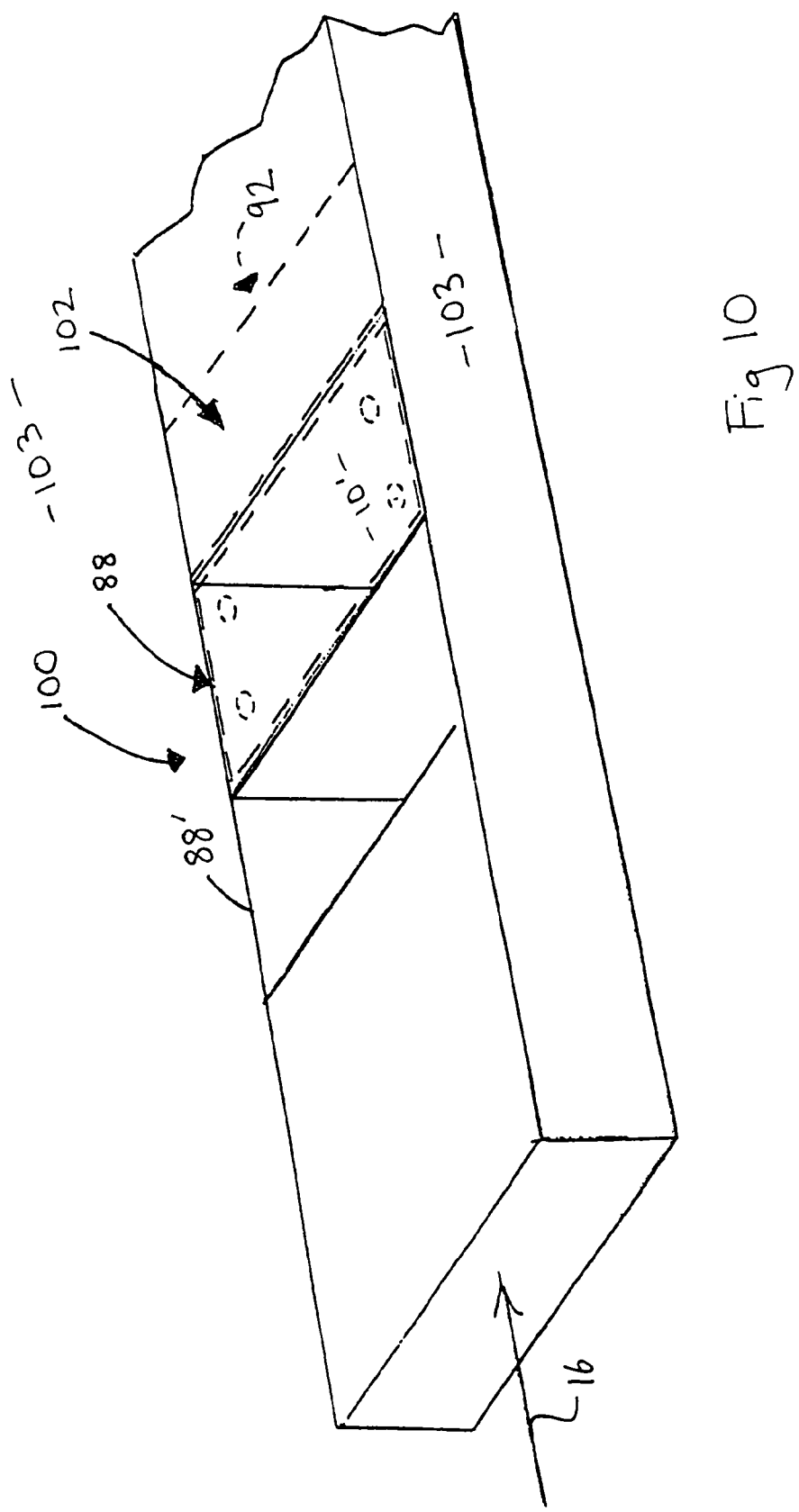
FIG. 10 is a schematic perspective view in partial cutaway of a processing line including an operative position in which a modular cutting unit of the cutting assembly of the present invention may be installed.

As shown in the accompanying drawings, the present invention is directed to a cutting assembly and more specifically a meat cutting assembly generally indicated as 10. In at least one preferred embodiment the meat cutting assembly 10 is constructed into a substantially self-contained modular unit, wherein the plurality of operative and structural components associated with the operation of the cutting assembly 10 are housed within, mounted on or otherwise connected to a housing or frame generally indicated as 12. As such, the cutting assembly 10 may be accurately described and referred to herein as a "modular cutting unit". The represented modular construction facilitates the efficient disposition of the modular cutting unit 10 within an operative position 88 of a processing line 100, as schematically represented in FIG. 10 and as will be described in greater detail hereinafter. In addition, the cutting assembly or modular cutting unit 10 also includes a path of travel 16 extending there through and at least partially defines a portion of the processing line 100.

However, while a preferred embodiment of the cutting assembly 10 is represented as the aforementioned modular cutting unit, it is emphasized that the operative components of the cutting assembly 10 can be installed and operate within a processing line 100 or other operative environment without being incorporated in a modular construction. In either application, the represented processing line 100 may extend upstream and/or downstream of the path of travel 16 and cutting assembly 10. Therefore, the processing line 100 may include a plurality of different cutting and/or processing assemblies, as at least partially represented in and described hereinafter with reference to FIG. 13, which are intended to interact with the meat product as it passes along the processing line 100 either before or after it reaches the operative position 88 of the cutting assembly 10.

Figure 1:
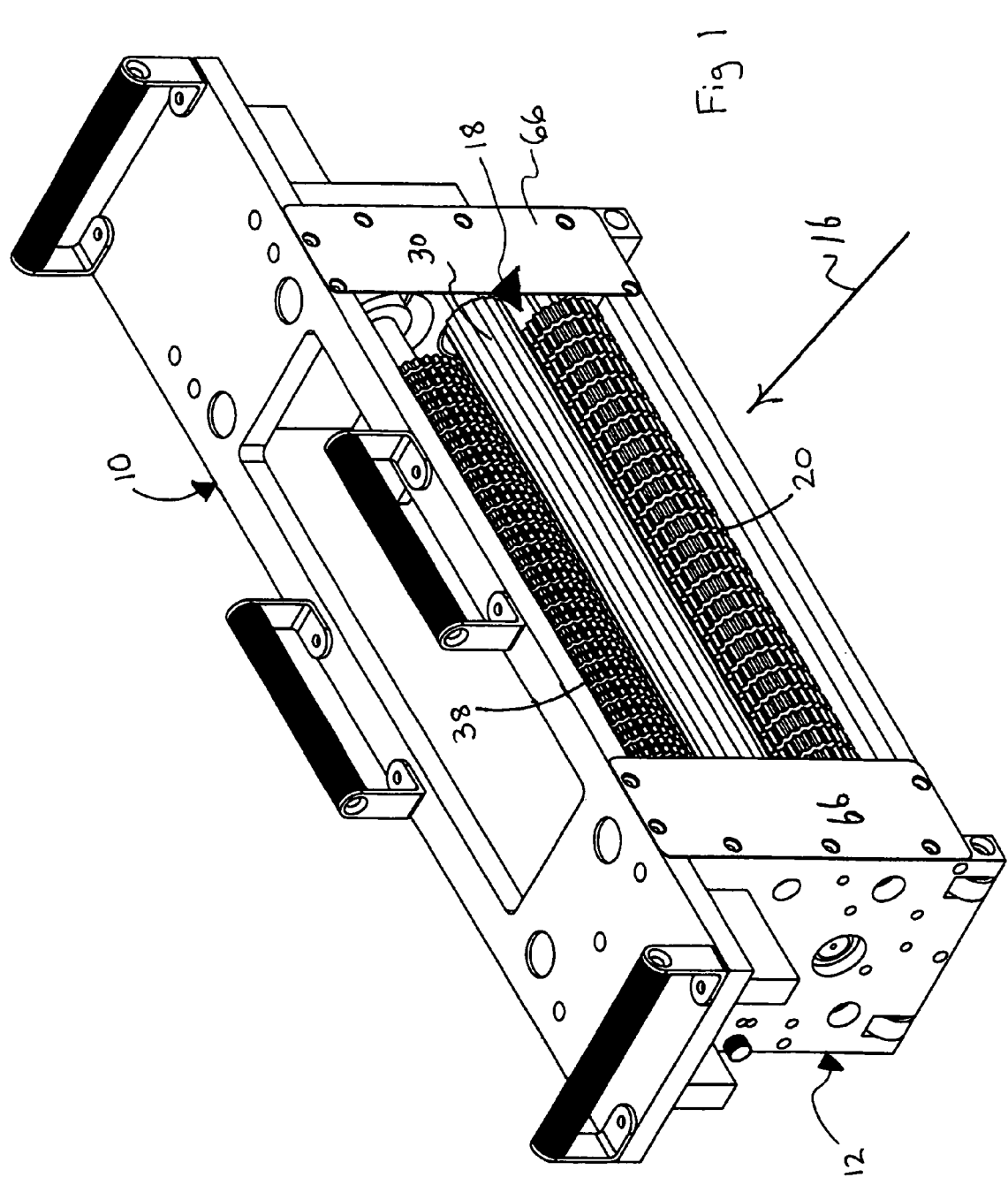
FIG. 1 is a front perspective view of the modular cutting unit of at least one preferred embodiment of the cutting assembly of the present invention.
Figure 2:
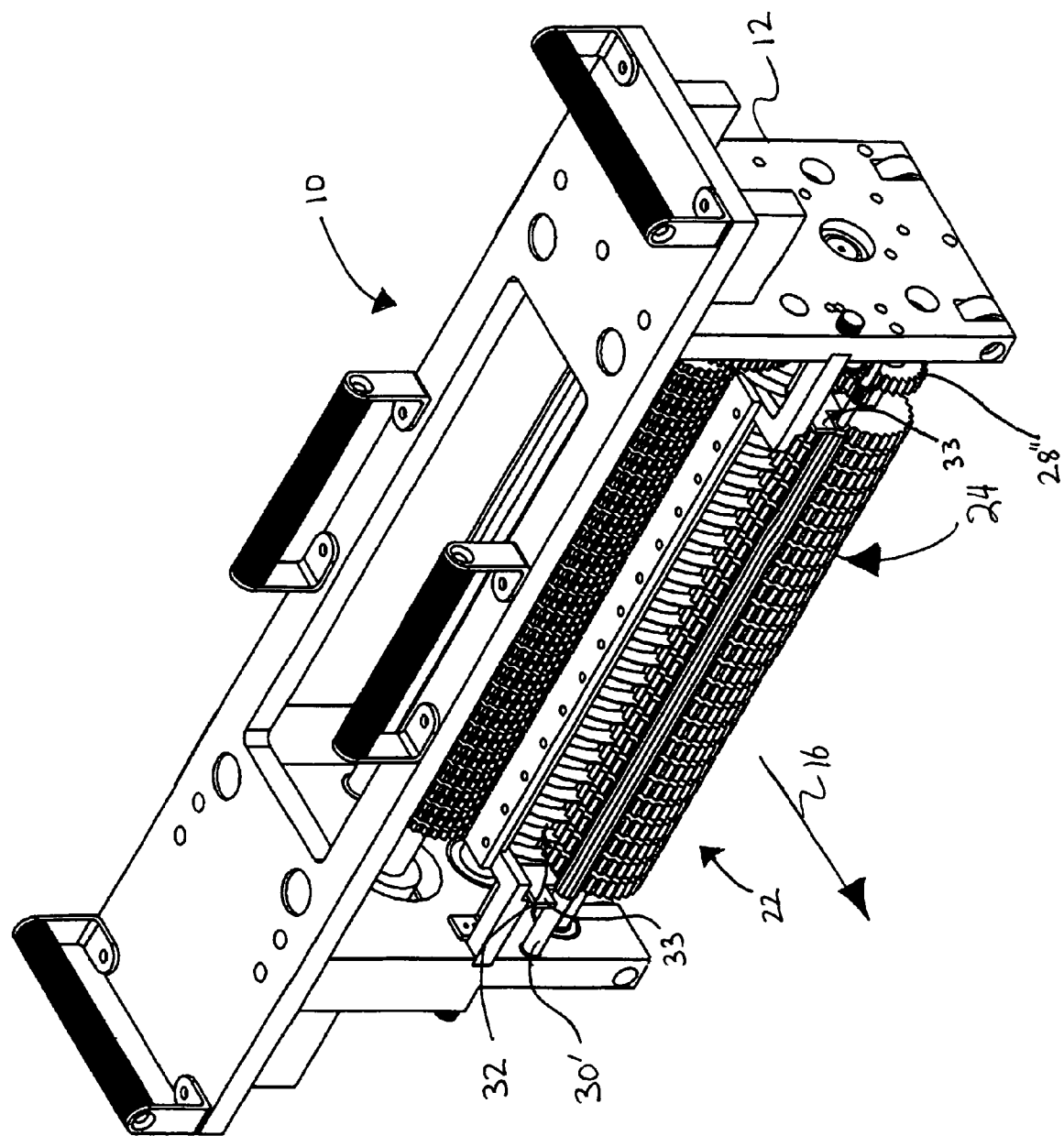
FIG. 2 is a rear perspective view of the embodiment of FIG. 1.

With primary reference to FIGS. 1 and 2, the cutting assembly 10, represented in the form of the modular cutting unit, includes the housing or frame 12. An in-feed assembly generally indicated as 18 is disposed at the entrance to the housing 12 and includes at least one in-feed roller 20 represented in detail in FIG. 3. In addition, the cutting assembly 10 includes an out-feed assembly generally indicated as 22 including at least one out-feed roller 24 disposed adjacent an exit of the housing 12. A comparison of the representations of FIGS. 1 and 2 clearly indicates that the in-feed roller assembly 18 is disposed in delivering or feeding relation to the interior of the frame or housing 12 and the operative components disposed therein. In contrast, the out-feed assembly 22 is located in spaced relation to the in-feed assembly 18 in a position to remove the meat product from the interior of the housing or frame 12 and the operative components therein.

Figure 3:
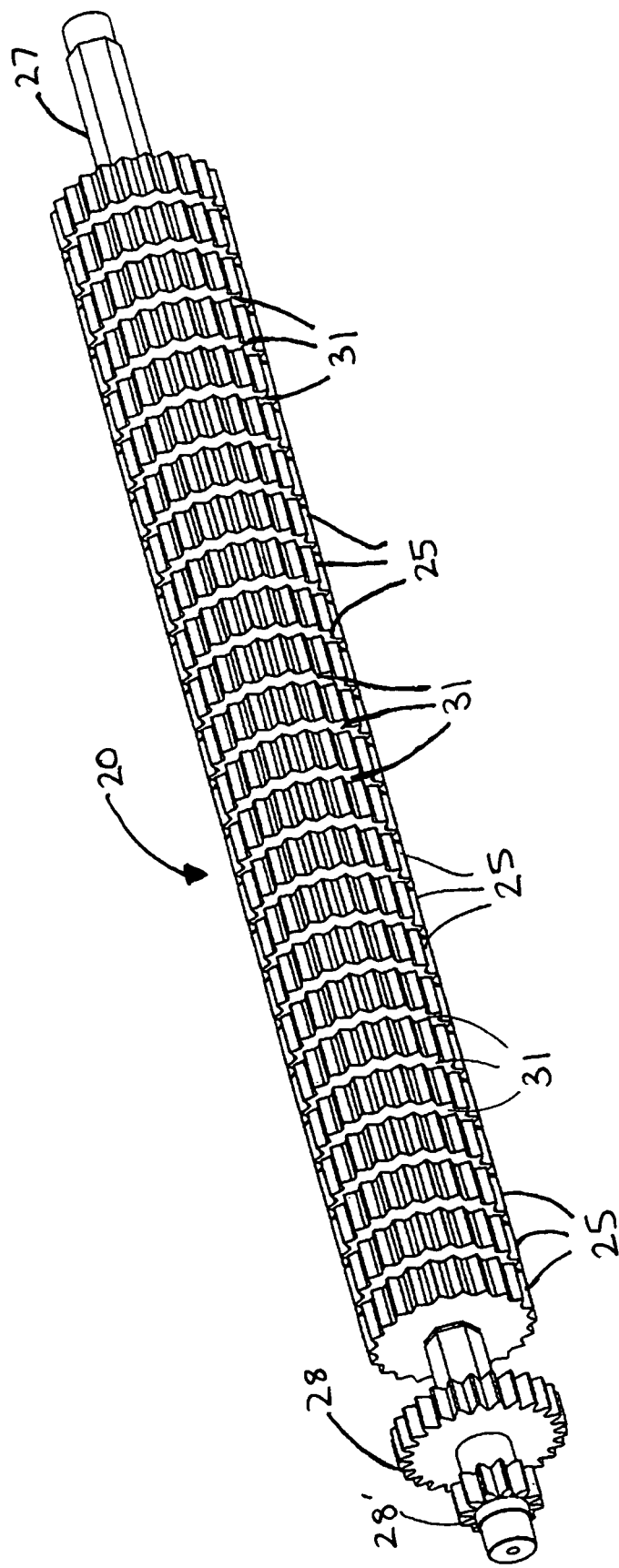
FIG. 3 is a perspective view of an in-feed roller associated with an in-feed roller assembly as represented in FIG. 1.
Figure 4:
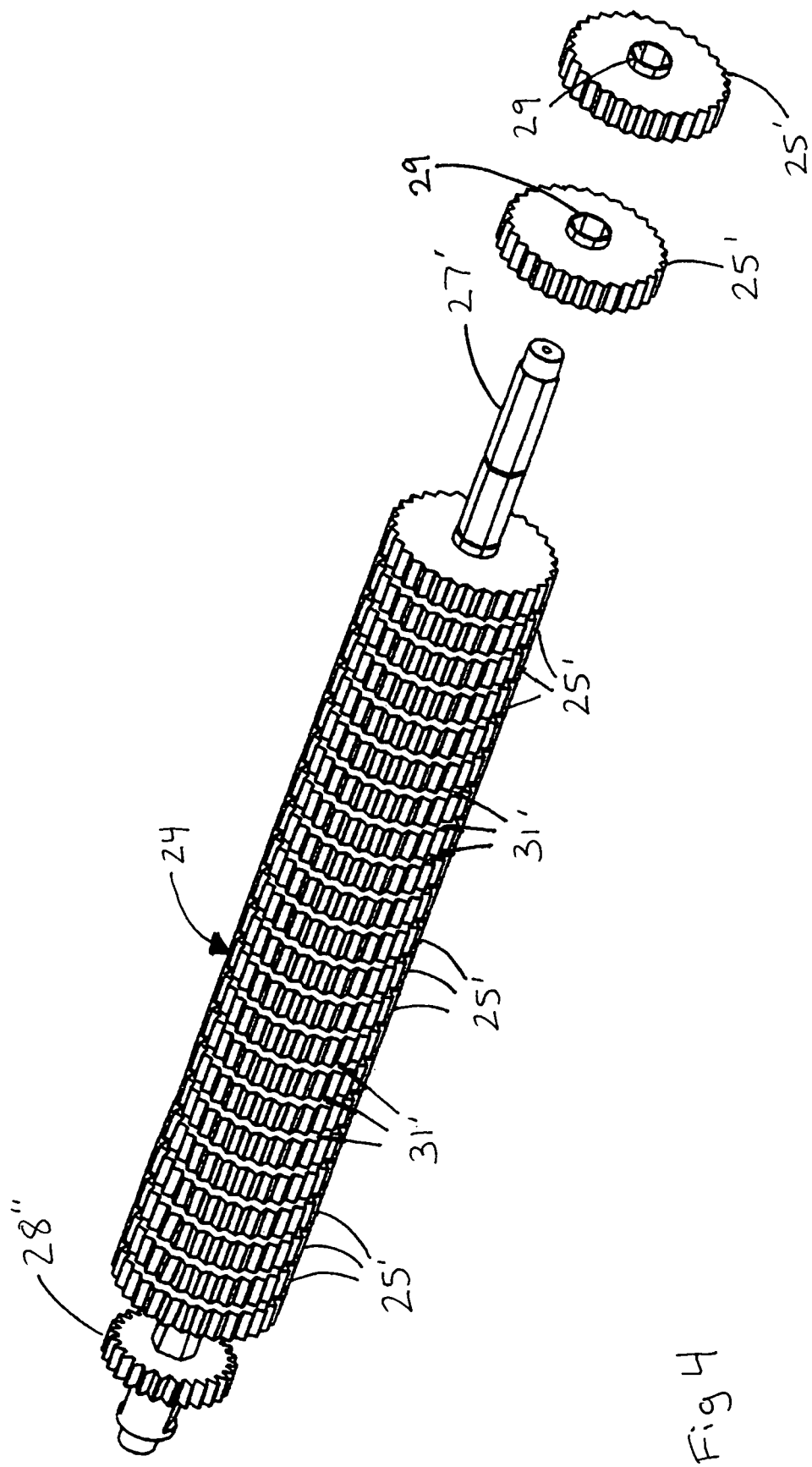
FIG. 4 is a perspective view of an out-feed roller associated with an out-feed roller assembly as represented in FIG. 2.

The in-feed and out-feed rollers 20 and 24 are respectively represented in FIGS. 3 and 4 and include a substantially equivalent structure, with the possible exception of dimensional variances. More specifically, the in-feed roller 20 of FIG. 3 includes a plurality of in-feed roller sections 25 which may have a smaller diameter than out-feed roller sections 25', as described hereinafter with reference to FIG. 4. Moreover, the in-feed sections 25 are disposed in predetermined spaced relation to one another, as at 31, as they are collectively connected to the in-feed roller core 27 in transverse relation to and along the length of the in-feed roller 20. The core 27 has a multi-sided configuration facilitating the rotation of each of the in-feed roller sections 25 with the core 27. Further, driving gears 28 and 28' may be attached to at least one end of the core 27 and are disposed and structured to facilitate the concurrent rotation of the in-feed roller 20 with the other operative components of the cutting assembly 10, as will be more apparent from the description hereinafter provided. The exterior surfaces of each of the in-feed roller sections 25 are roughened or irregular in the sense that the continuous exterior surfaces are not smooth. This irregular, roughened or non-smooth exterior surface may comprise a plurality of teeth like structures, as represented, in order to provide a gripping and/or driving engagement with the meat product. As such, the meat product is forced to travel along the path of travel 16 and through the housing 12 of the cutting assembly 10 upon a rotation of the in-feed roller 20.

With primary reference to FIG. 4, the out-feed roller 24 has substantially similar structural features as the in-feed roller 20 including a plurality of out-feed roller sections 25' connected to and extending along the entire length of the core 27' of the out-feed roller 24. Similarly, at least one drive gear 28" may be located at one or both of the opposite ends of the elongated multi-sided core 27' for purposes of accomplishing a forced rotation of the out-feed roller 24 as the meat product being cut passes along the path of travel 16 through the housing or frame 12. Both the in-feed and out-feed roller sections 25 and 25' are disposed in a predetermined spaced relation to one another, as at 31 and 31' respectively, as they collectively extend along the length of the respective cores 27 and 27'. The spaces 31 and 31' between the in-feed roller sections 25 and the out-feed rollers segments 25' respectively, may be determined by an integrally or otherwise fixedly secured spacer member 29 connected to the plurality of in-feed roller sections 25 and out-feed roller sections 25'. For purposes of clarity the spacers 29 associated with the respective in-feed and out-feed roller sections 25 and 25' are not represented in the embodiment of FIG. 3. In addition and as will be more apparent hereinafter, the spaces 31 and 31', respectively disposed between the in-feed roller sections 25 and the out-feed roller sections 25', are sufficiently dimensioned to allow cutting blades 34 of the blade roller 32 to be rotationally disposed therein.

Further structural features associated with the in-feed assembly 18 include the provision of a guide roller 30 cooperatively disposed adjacent to the in-feed roller 20. The relative positions and cooperative structuring of the in-feed roller 20 and guide roller 30 are such that the meat product being cut passes between the in-feed roller 20 and the guide roller 30. In addition, a supplementary guide roller 30' may be disposed as part of the out feed assembly 22, preferably adjacent the out-feed roller assembly 24, as represented in FIG. 2. The placement, dimension and overall configuration of the supplementary guide roller 30' is such as to facilitate passage of the cut meat portions from the out-feed assembly 22 and the modular housing or frame 12. Also, to assure an intended travel or passage of the meat product through and from the out-feed roller assembly 22, the rotational speed of the supplementary guide roller 30' is greater, preferably in the range of four times greater, than that of the out-feed roller 24, as well as the in-feed roller 20, the guide roller 30 and the mate roller 38. More specifically, as the meat product passes from the interior of the housing or frame 12 it will pass from between the blade roller 32 and the out-feed roller 24 and over the supplementary guide roller 30'.

With further reference to FIG. 3, additional features of at least one embodiment of the present invention is the provision of guide structures or members 33 disposed adjacent opposite ends of the out-feed roller 24 and supplementary guide roller 30', as represented. These guide structures 33 are disposed and structured to guide and facilitate the passage of the meat product through and from the out-feed roller assembly 22 in a manner which prevents or significantly reduces the possibility of the meat product interfering with and/or engaging the correspondingly disposed gears, such as at 28" or any gears interacting therewith, as also represented in FIG. 3.

Figure 5:
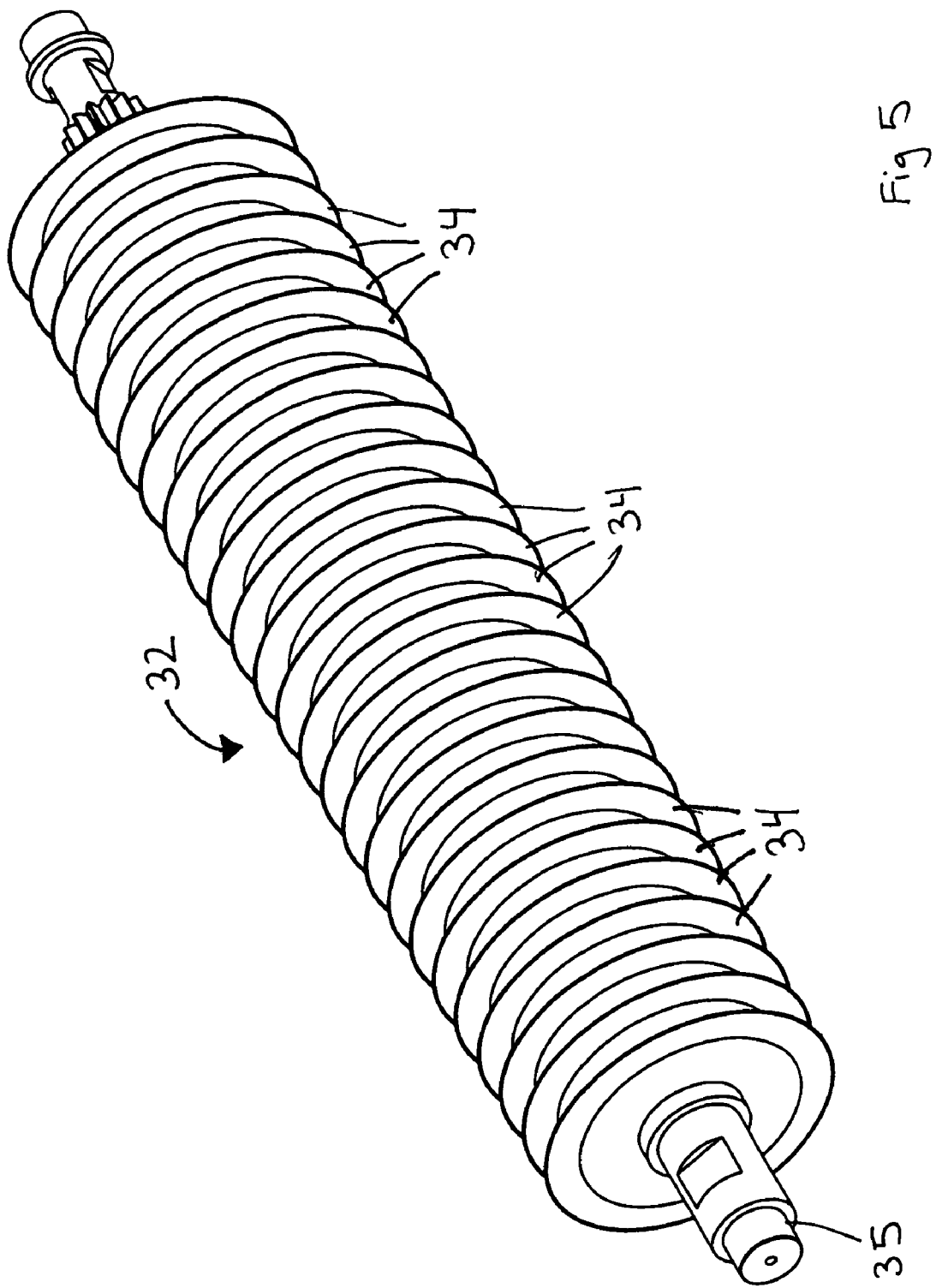
FIG. 5 is a perspective detail view of the blade assembly of the present invention comprising at least one blade roller and a plurality of blades connected thereto.

With primary reference to FIG. 5, additional structural features of the cutting assembly 10 include the provision of the blade assembly comprising at least one blade roller generally indicated as 32. The blade roller 32 comprises a plurality of spaced apart, substantially parallel blades 34 each connected to the elongated core 35 of the blade roller 32. As such, each of the plurality of blades 34 are transversely oriented relative to the core 35 and rotate therewith in order to accomplish the intended cutting procedure of the meat product passing through the housing or frame 12 and along the path of travel 16.

As represented in FIGS. 1 through 5, the blade roller 32 is located on the interior of the housing or frame 12 in interactive relation with the in-feed roller 20 and the out-feed roller 24. Accordingly the plurality of blades 34 are disposed in transverse relation to the length of the core 35 and are disposed in substantially aligned relation to the direction of travel of the meat product as it passes along the path of travel 16 through the housing or frame 12. The transverse orientation of the plurality of cutting blades 34 and their alignment with the path of travel 16 facilitates the meat being cut into a plurality of strips or similarly configured portions. Accordingly, while the length of the cut meat portions may vary, the width thereof is substantially determined by the distance between the substantially parallel cutting blades 34.

Figure 6:
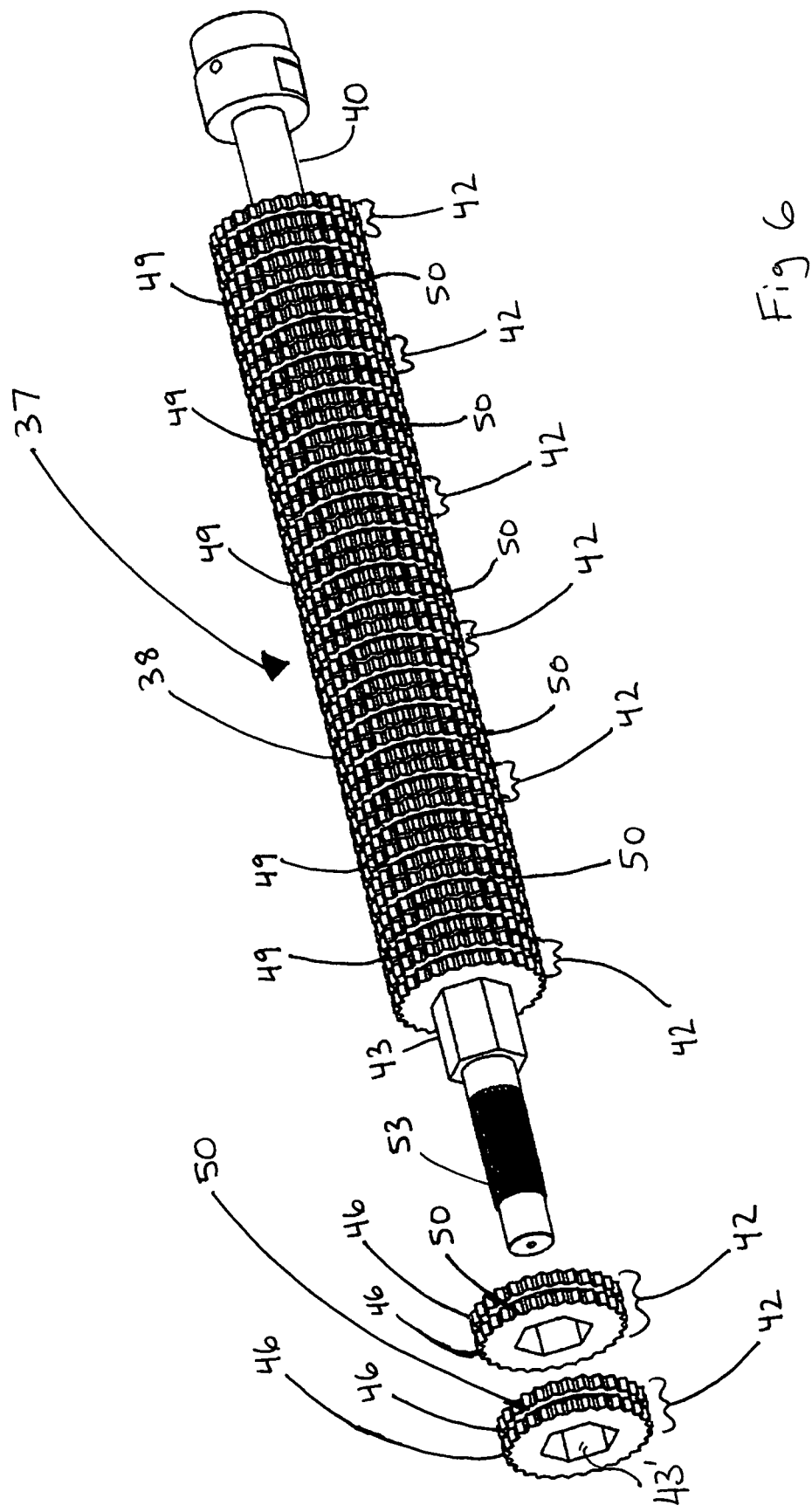
FIG. 6 is a perspective view of a mate assembly including at least one mate roller.
Figure 7:
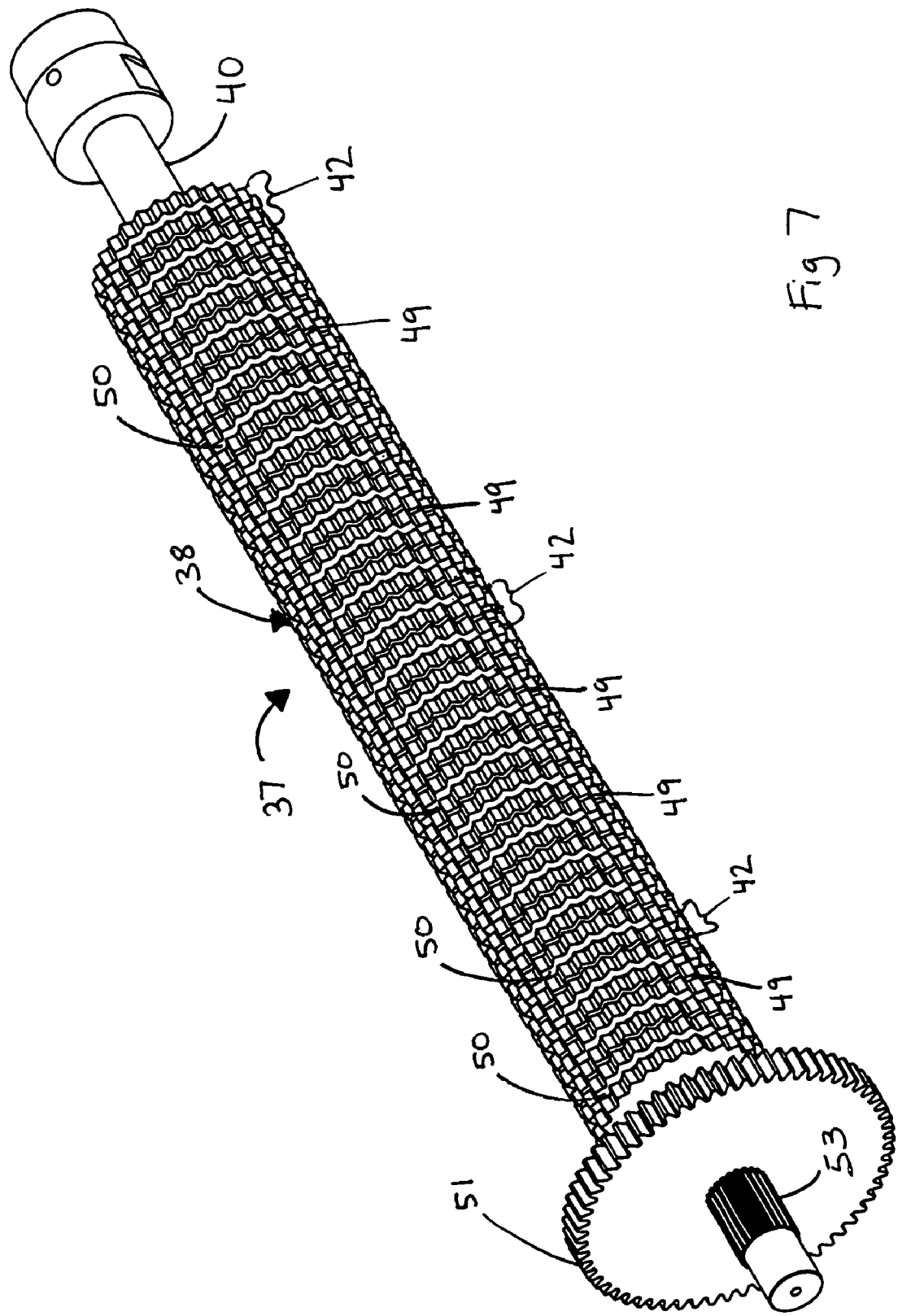
FIG. 7 is a perspective view of the embodiment of FIG. 6.

The intended cutting procedure of the meat product passing through the housing or frame 12 is further facilitated by a mate assembly 37 comprising at least one mate roller 38 represented in FIGS. 6 and 7. As such, the mate roller 38 includes an elongated, core 40 and a plurality of mate roller sections 42 connected in transverse relation to the length of the core 40 and rotational therewith. Rotation of the plurality of mate roller sections 42 with the core 40 is accomplished by a multi-sided mounting portion 43 extending along the length of the core 40 and dimensioned and configured to be disposed within the multi-sided central apertures 43' of each mate roller section 42.

Further, each or at least a majority of the plurality of mate roller sections 42 comprise two mate segments 46. Moreover, the mate roller sections 42 are separated from one another by a "first predetermined space" 49 along the length of the core 40 of the mate roller 38. Further, the two mate segments 46 of each mate roller section 42 are separated from one another by a "second predetermined space" 50. In at least one preferred embodiment the width of each of the second predetermined spaces 50, existing between corresponding mate segments 46, is greater than the width of each of the first predetermined spaces 49, existing between adjacent ones of the plurality of mate roller sections 42. As represented in FIGS. 6 and 7 and set forth in greater detail hereinafter, the first predetermined space 49 is significantly less than the second predetermined space 50 in order that the mate roller 38 is disposed and structured for intended interactive operation with the blade roller 32 and the plurality of blades 34.

In operation, the blade roller 32 and the mate roller 38 are cooperatively disposed and dimensioned such that each of the plurality of blades 34 interact with correspondingly positioned ones of the mate roller sections 42 during concurrent rotation of the blade roller 32 and the mate roller 38. More specifically, as the plurality of blades 34 and plurality of mate roller sections 42 concurrently rotate, the blades 34 are rotational within corresponding ones of the first predetermined spaces 49. Further, the width of each of the plurality of first predetermined spaces 49 substantially corresponds to the thickness of the corresponding blade rotating therein, it being understood that the width of the first predetermined spaces 49 are at least minimally greater than the thickness of the blades rotating therein so as to accommodate such rotation. Accordingly, the relative dimensions of each of the blades 34 and corresponding ones of the first predetermined spaces 49 is such that the blades 34 will occupy at least a majority of the predetermined first spaces 49 in which they are rotating, during concurrent rotation of the blade roller 32 and the mate roller 38. This cooperative dimensioning and the relative disposition, which facilitates the passage of the individual blades 34 through the first predetermined spaces 49, serve to prevent or significantly reduce the possibility of cut meat portions passing into the first predetermined spaces 49 during the cutting procedure. Driving interconnection and forced rotation of the mate roller 38 with the drive mechanism of the cutting assembly is accomplished by the dedicated drive gear 51 connected to the threaded or ribbed mounting portion 53 of the core 40 at one or both opposite ends.

As will be explained in greater detail with respect to the structural features of FIG. 8, provision is made to stabilize the longitudinal positions of the mate roller sections 42 relative to one another and along the length of the core 40 of the mate roller 38. It is also important to remove or prevent the meat from entering or remaining within the second predetermined space 50 during the continuous rotation of the blade roller 32 and the mate roller 38. Accordingly the present invention comprises a stabilizing assembly 60 having a base 62 fixedly connected to the housing or frame 12 across the path of travel and adjacent to the mate roller 38. The base includes a plurality of fingers or prongs 64 fixedly secured to the base 62 and extending outwardly from a peripheral or longitudinal side thereof. Further, the prongs 64 are disposed, dimensioned and configured to be disposed within the correspondingly positioned ones of the aforementioned second predetermined spaces 50 existing between the two mate segments 46 of each of the mate roller sections 42 of the mate roller 38 during its rotation. The disposition of the prongs or fingers 64 within the corresponding second predetermined spaces 50 serves to extract, remove and/or clear any meat particles from between the two mate segments 46 of each of the mate roller sections 42 as the mate roller 38 rotates.

In addition, at least one preferred embodiment of the cutting assembly 10 comprises the mate roller sections 42 being non-fixedly attached to the core 40 of the mate roller 38 in a manner that permits an at least minimal longitudinal movement or limited displacement in the position thereof along the length of the mate roller 38, while maintaining a concurrent rotation of the mate roller sections 42 with the mate roller 38. Accordingly, the proper and intended longitudinal positioning of the plurality of mate roller sections 42 on the core 40 of the mate roller 38 serves to accurately align the first predetermined spaces 49 with corresponding ones of the cutting blades 34. This accurate alignment is due at least in part to the disposition of the fixed prongs 64 of the stabilizing assembly 60 being disposed within the second predetermined spaces 50 between the mate segments 46. Accordingly, the non-fixed, but still limited, positioning of the plurality of mate roller sections 42 along the length of the mate roller 38 allows for the aforementioned at least a minimal movement or displacement of the position of the mate roller sections 42 due to their interaction with the fixed prongs 64 disposed within the second predetermined spaces 50. As a result there may be an at least minimal variance in the size of the first predetermined spaces 49 between the mate roller sections 42. In turn, this minimal size variance provides an appropriate dimensional tolerance between the position of the blades 34 and the position of the corresponding mate roller sections 42, as the blades 34 rotate within the first predetermined spaces 49 and interact with the mate roller 38.

As also represented in FIG. 8, the plurality of out-feed roller sections 25' pass continuously between correspondingly disposed adjacent ones of the blades 34 as both the blade roller 32 and the mate roller 38 continue to rotate during the cutting procedure. The interaction between the blade roller 32, the mate roller 38 and the out-feed roller 24 is clearly represented. As set forth above, each of the plurality of blades 34 are disposed and dimensioned to pass through a correspondingly positioned one of the first predetermined spaces 49 existing between each of the mate roller sections. In addition interaction between the out-feed roller 24 and the blade roller 32 prevents or significantly reduces the possibility of portions of the meat product sticking to or otherwise clogging the spaces between the blades 34. More specifically, each of the plurality of out-feed roller sections 25' will continuously pass between the blades 34 in order to remove any cut portions of meat or prevent the cut portions of the meat from remaining between the blades 34. Therefore, upon concurrent rotation of the blade roller 32, the mate roller 38 and the out-feed roller 24, each of the plurality of blades 34 will pass through a corresponding first predetermined space 49 at the same time that the out-feed roller sections 25' will pass between corresponding blades 34.

Figure 9:
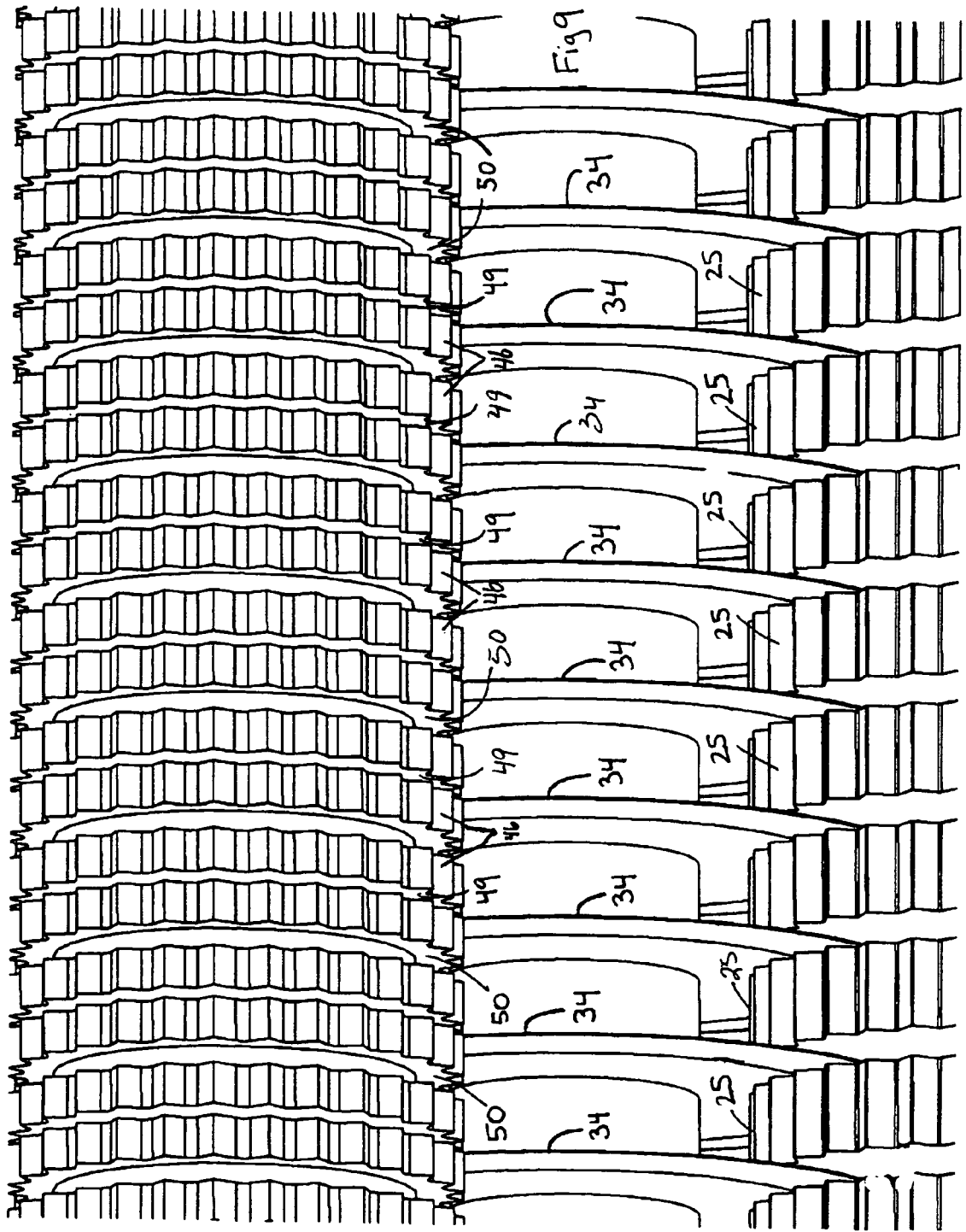
FIG. 9 is a detail view of the blade roller, interacting mate roller and cooperatively disposed and structured out-feed roller.

FIG. 9 represents additional interaction between the in-feed roller sections 25, associated with the in-feed roller 20; the plurality of blades 34, associated with the blade roller 32 and the mate roller sections 42, associated with the mate roller 38. Each of the in-feed roller sections 25 passes between correspondingly disposed ones of the plurality of blades 34, during concurrent rotation of the in-feed roller 20 and the blade roller 34.

Additional structural features are also represented in FIG. 1 wherein shield or blocking plates or like members 66 may be disposed adjacent opposite ends of the in-feed assembly 18 in order to prevent the meat from passing beyond the opposite ends of the in-feed roller 20, blade roller 32 and mate roller 38. Further, proper orientation and positioning of the product being cut are accomplished by regulating the speed of the various roller components. As represented, the guide roller 30 is associated with the in-feed assembly 18 and is rotating at substantially the same speed as that of the in-feed roller 20, mate roller 38 and out-feed roller 24. However, as set forth above, the rotational speed of the supplementary guide roller 30' is preferably four times as great as these rollers. Similarly, the rotational speed of the blade roller 32 is regulated relative to that of the mate roller 38. In order to accomplish a clean, consistent cut of the product passing through the frame or housing 12, the blade roller 32 and the plurality of blades 34 connected thereto and rotational therewith, travel at a rotational speed generally about 4 times the speed of the mate roller 38.

As also described above, the meat cutting assembly 10 of the present invention includes the ability to efficiently and effectively be installed as a modular cutting unit into an appropriate, operative location 88 within and along the processing line 100, as schematically represented in FIG. 10. As such, the processing line 100 includes the at least operative position 88 which may comprise a cavity, chamber or receiving area for the modular cutting unit 10 along the processing line 100. As set forth above the modular cutting assembly 10 includes the path of travel 16, which may coincide with the processing line 100 along which the meat or food products being cut or otherwise processed travels. In order to facilitate placement of the modular cutting unit or assembly 10 into the appropriate operative position or cavity/chamber 88, a delivery assembly generally indicated as 90 is utilized.

Figure 11:
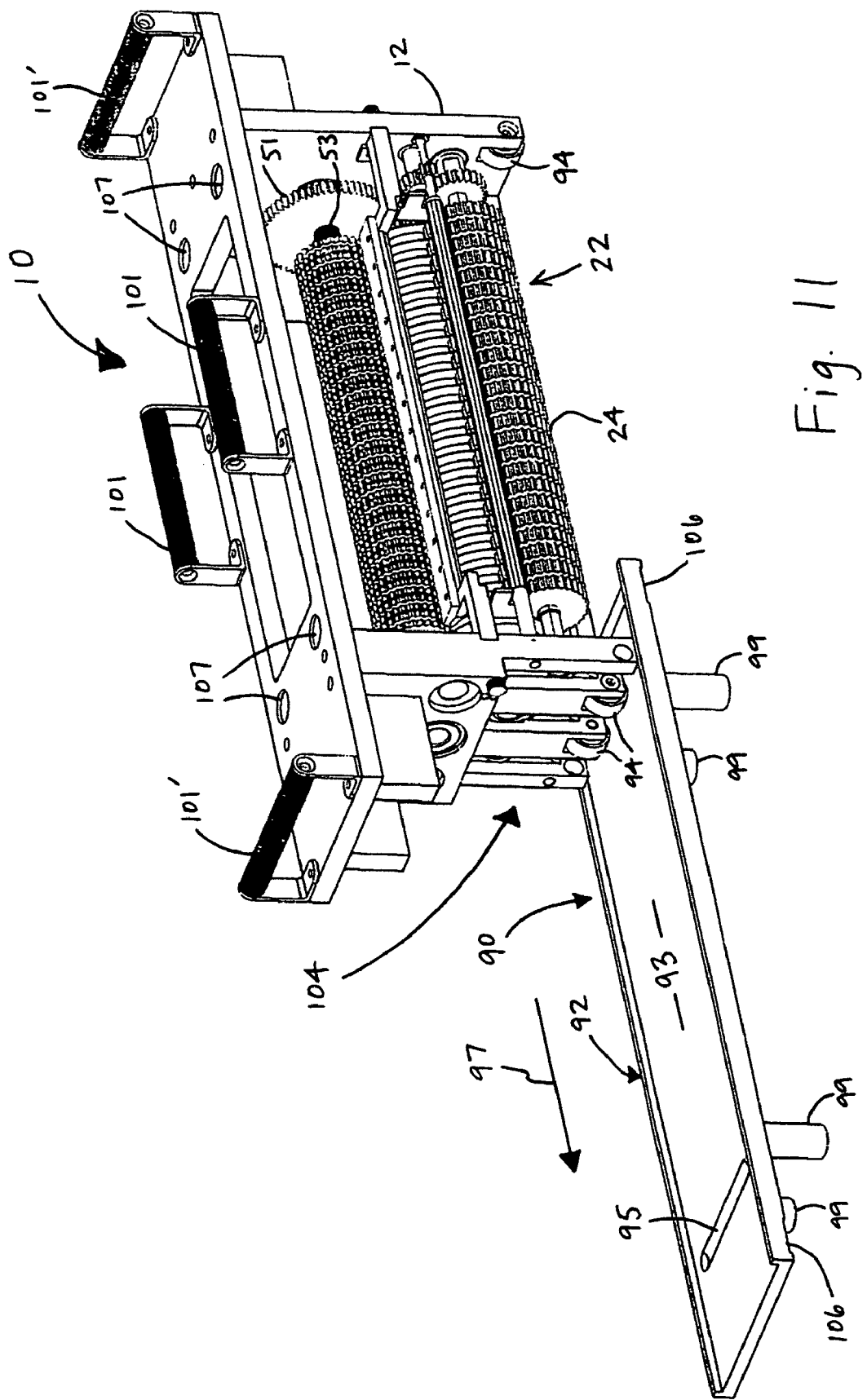
FIG. 11 is a perspective view of the modular cutting unit of at least one preferred embodiment of the present invention partially mounted on a delivery assembly.
Figure 12:
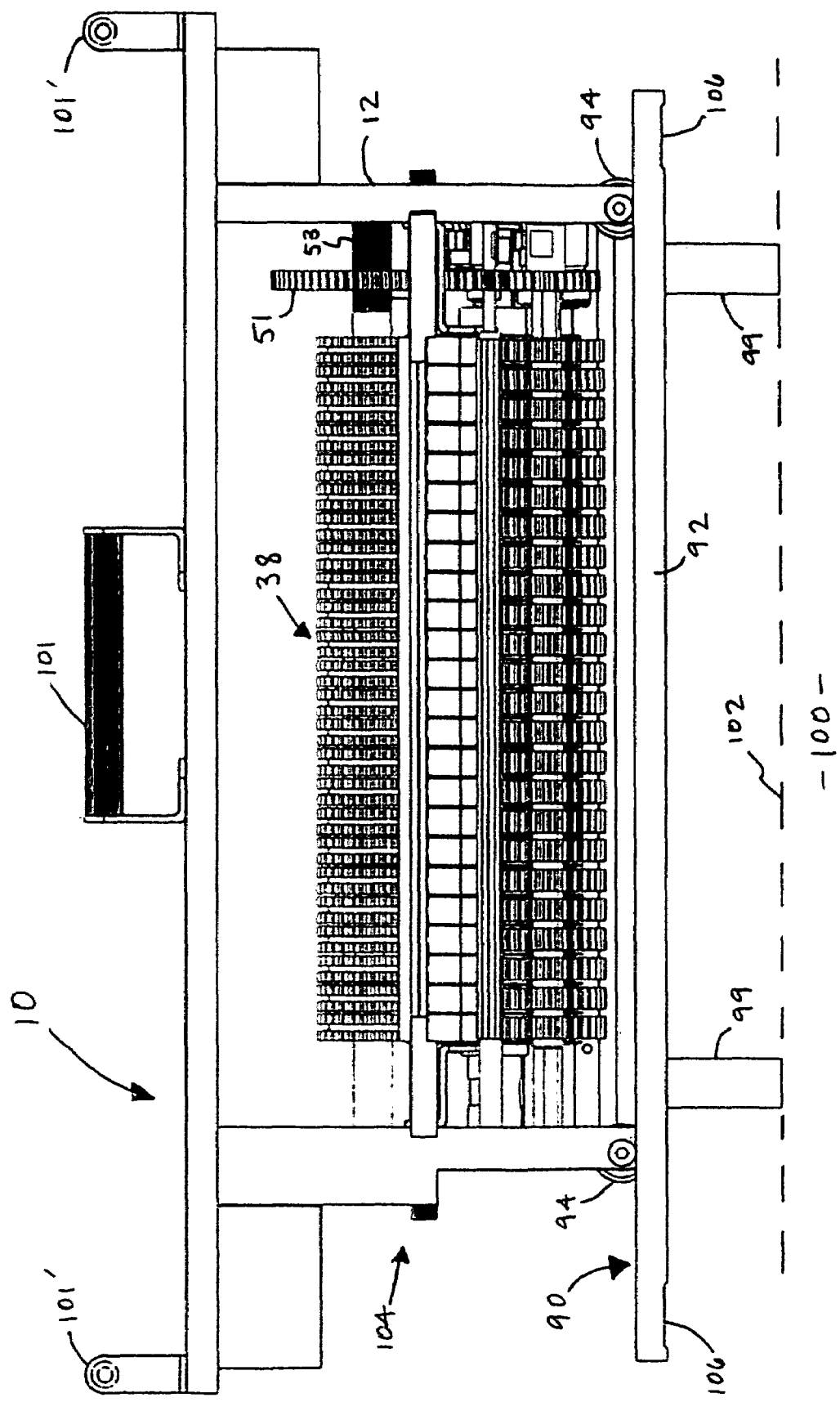
FIG. 12 is a side view in partial phantom, wherein the modular cutting unit of the cutting assembly of the present invention is supported on the delivery assembly, which is disposed on an upper portion of the processing line of FIG. 10 adjacent the intended operative position in which the modular cutting unit will be installed.

As represented in FIGS. 11 and 12, the delivery assembly 90 comprises a substantially elongated support platform 92 dimensioned and configured to have the modular cutting unit or assembly 10 supported thereon. As such, the overall dimension and configuration of the support platform 92 may at least partially correspond to at least the under portion of the modular cutting unit 10. In order to facilitate ease and efficiency of placement of the modular cutting unit 10 onto the outer or upper exposed surface 93 of the support platform 92, the modular cutting unit 10 includes a plurality of wheels, rollers or like structures 94. The wheels, rollers, etc. 94 are positioned so as to movably engage the outer exposed surface 93 of the support platform 92. In addition, a groove or channel 95 is disposed in at least partially recessed relation into and across the outer surface 93 of the support platform 92. As such, the channel 95 is dimensioned and disposed in receiving, interruptive relation to the wheels or rollers 94 on the frame 12. The provision of the channel 95 and its receipt of the wheels therein, prevents inadvertent displacement or falling of the corresponding end of the frame 12 from the corresponding end of the support platform 92, as the modular cutting unit or assembly 10 is rolled onto outer surface 93 of the support platform 92 in the direction indicated by arrow 97.

Additional structural features associated with the delivery assembly 90 and in particular the support platform 92 includes a plurality of spacers or legs 99 extending outwardly or downwardly from the under surface of the support platform 92 as represented. The purpose of the spacer legs 99 will be made apparent hereinafter with regard to the efficient positioning of the modular cutting unit assembly 10 into its operative position 88 represented by the chamber or cavity existing along the processing line 100. Further facilitating the handling, carrying and/or selective positioning of the modular cutting unit or assembly 10 is the provision of a handle assembly including a plurality of handles 101. It will be noted that the plurality of handles 101 are disposed in spaced relation to one another and vary in orientation. One or more of the handles 101 extend longitudinally along the length of the modular cutting assembly 10, wherein others of the plurality of handles, as at 101', are located transverse to such length. The different orientations of the various handles 101 and 101' allow for efficient carrying and/or positioning of the modular cutting assembly 10 by one or more individuals.

Accordingly with primary reference to FIGS. 10 through 13, placement of the modular cutting assembly 10 in its operative position 88 and within an intended chamber or cavity of the processing line 100 involves a first placement of the support platform 92 in the delivering position generally indicated as 102 and represented in phantom lines in FIGS. 10 and 12. Secure and stable placement of the support platform 92 on the upper portion of the processing line 100 may be facilitated by recessed portions 106, when the upper area of the processing line 100 is not structured to support the spacer legs 99. When the support platform 92 is disposed in the delivering position 102, the modular cutting unit 10 is carried and lifted by an adequate number of individuals, using the handle structures 101. By way of example, the individuals may carry the modular cutting unit 10 to the processing line 100 by approaching it from a single side, such as at 103 in FIG. 10. The modular cutting unit 10 is then lifted onto the support platform 92 such that one end thereof 104, as represented in FIG. 11, is placed on the exposed, supporting surface 93. When so positioned the modular cutting assembly 10 is then rolled along the length of the support platform 92, in accord with directional arrow 97, until the wheels are received within the retaining channel 95.

With reference to FIG. 12, once the modular cutting assembly 10 is disposed along the full length of the support platform 92 and further when the support platform 92 is disposed in the delivering position 102 on the upper surface of the processing line 100, the modular cutting assembly 10 is then lifted upwardly from the support platform 92 by personnel or individuals located on opposite sides of the processing line 100 as at 103 and 103', represented in FIG. 10. The provision of transverse handles 101' facilitates handling of the modular cutting unit or assembly 10 from such opposite sides 103 and 103'. The modular cutting unit 10 is then lowered into the operative position 88 which may be defined by a cavity or chamber. As also represented in FIG. 10, the first operative placement of a modular cutting unit 10 is indicated in phantom lines as 10' for the reasons to become apparent from the description of the embodiment of FIG. 13.

Accordingly after placement of the modular cutting unit or assembly 10', in the operative position 88, it may be necessary to place an additional cutting assembly or other processing component 10 in the adjoining operative position 88' of FIG. 10, which may also be defined by a receiving chamber or cavity. Accordingly, as represented in FIG. 13, the support platform 92 is moved from the delivering position 102, as represented in FIGS. 10 and 12, and placed on top of the cutting assembly or other processing unit 10' which is already located within its intended operative position 88 along the processing line 100. When the support platform 92 is disposed on top of the modular cutting or processing unit 10', which has already been operatively placed in the processing line 100, the spacer legs 99 will be disposed within recessed areas 107 formed on the upper or outer surface of the housings 12 of the modular cutting assembly 10, 10' to provide stability. Thereafter the modular cutting unit 10 to be disposed into the operative position 88' of the processing line 100, adjacent the already positioned processing unit 10', is lifted, using the transversely oriented handle structures 101', and lowered into the adjacent cavity or chamber 88' associated with the processing line 100 as represented in FIGS. 10 and 13. When the processing line is ready for operation the support platform 92 is then removed from the processing line 100.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for cutting meat passing along a path of travel, said assembly comprising:
   a) at least one blade roller including a plurality of spaced apart blades connected in transverse relation to a length of the blade roller and rotational therewith,
   b) at least one mate roller disposed in engaging relation to the meat passing along the path of travel concurrently to said blade roller,
   c) said mate roller comprising a plurality of mate roller sections transversely disposed along a length of said mate roller at a first predetermined space from one another,
   d) each of said plurality of blades passing into and through correspondingly aligned ones of said first predetermined spaces during concurrent rotation of said blade roller and said mate roller,
   e) an in-feed assembly and an out-feed assembly extending transversely along the path of travel in delivering and removing relation respectively to said blade roller and said mate roller, and
   f) wherein at least said out-feed assembly is disposed in interacting, meat clearing relation to said plurality of blades.

2. An assembly as recited in claim 1 said plurality of mate roller sections are disposed in non-fixed positions on and along the length of said mate roller.

3. An assembly as recited in claim 2 wherein at least a majority of said mate roller sections include two mate segments, said two mate segments of each of said mate roller sections disposed at a second predetermined space from one another.

4. An assembly as recited in claim 3 further comprising a stabilizing assembly at least partially disposed within said second predetermined space of each of said mate roller sections in meat clearing relation thereto during rotation of said mate roller.

5. An assembly as recited in claim 3 wherein said stabilizing assembly is disposed in position stabilizing relation to said plurality of mate roller sections within said second predetermined space of each of plurality of mate roller sections.

6. An assembly as recited in claim 5 wherein said first predetermined space comprises a variable transverse dimension greater than a thickness of a corresponding one of said plurality of blades; each of said plurality of blades disposed and dimensioned to occupy at least the majority of a corresponding one of said first predetermined spaces during concurrent rotation of said blade roller and said mate roller.

7. An assembly as recited in claim 1 wherein said out-feed assembly comprises an out-feed roller including a plurality of out-feed roller sections, said plurality of out-feed roller sections rotationally disposed between corresponding, adjacently disposed ones of said plurality of blades.

8. An assembly as recited in claim 7 wherein said plurality of out-feed roller sections are transversely oriented along a length of said out-feed roller in spaced relation to one another and in off-set relation to said plurality of blades.

9. An assembly as recited in claim 8 wherein said in-feed assembly comprises a plurality of in-feed roller sections disposed in interacting relation to said plurality of blades.

10. An assembly as recited in claim 9 wherein said plurality of in-feed roller sections are rotationally disposed between corresponding, adjacently disposed ones of said plurality of blades.

11. An assembly as recited in claim 1 wherein said in-feed assembly comprises an in-feed roller including a plurality of in-feed roller sections disposed in interacting relation with said plurality of blades.

12. An assembly as recited in claim 11 wherein said plurality of in-feed roller sections are rotationally disposed between corresponding, adjacently disposed ones of said plurality of blades.

13. An assembly as recited in claim 11 wherein said in-feed assembly further comprises a guide roller disposed adjacent said in-feed roller substantially adjacent an entrance to the path of travel.

14. An assembly as recited in claim 1 wherein said out-feed assembly comprises a out-feed roller and a supplementary guide roller, said supplementary guide roller rotationally mounted substantially adjacent said out-feed roller and concurrently rotational therewith at a greater predetermined rotational speed than said out-feed roller.

15. An assembly as recited in claim 14 wherein said predetermined rotational speed of said supplementary guide roller is generally about four times greater than that of said out-feed roller.

16. An assembly as recited in claim 1 wherein said blade roller is rotationally disposed along the path of travel at a rotational speed substantially greater than that of said mate roller.

17. An assembly as recited in claim 16 wherein said rotational speed of said blade roller is substantially about four times greater than that of said mate roller.

18. An assembly as recited in claim 1 wherein each of said plurality of mate roller sections comprise two mate segments, said mate roller sections separated form one another by said first predetermined space; said two mate segments of a common one of said plurality of mate roller sections being disposed along the length of said mate roller at a second predetermined space from one another; a stabilizing assembly fixedly connected along the path of travel and including a plurality of prongs each fixedly disposed within a correspondingly disposed one of said second predetermined spaces in position stabilizing relation to said mate roller sections.

19. An assembly as recited in claim 18 wherein said stabilizing assembly comprises an elongated base fixedly connected adjacent to and along the length of said mate roller in transverse relation to the path of travel; said plurality of prongs fixedly connected to and extending outwardly from said base into correspondingly disposed ones of said second predetermined spaces.

20. An assembly for cutting meat passing along a path of travel, said assembly comprising:

a) at least one blade roller including a plurality of spaced apart blades connected in transverse relation to and along a length of the blade roller and rotational therewith,
b) at least one mate roller disposed in engaging relation to the meat passing along the path of travel concurrently to said blade roller,
c) said mate roller comprising a plurality of mate roller sections transversely connected to and along a length of said mate roller and rotational therewith, each of said mate roller sections disposed a first predetermined space from a next adjacent mate roller section,
d) each of said plurality of mate roller sections comprising two mate segments separated by a second predetermined space,
e) an in-feed assembly and out-feed assembly disposed along said path of travel in delivering and removing relation respectively to said blade roller and said mate roller,
f) each of said plurality of blades passing into and through a correspondingly aligned one of said first predetermined spaces during concurrent rotation of said blade roller and said mate roller, and
g) a stabilizing assembly fixedly connected along the path of travel adjacent said blade roller and at least partially disposed within said second predetermined spaces of said plurality of mate roller sections.

21. An assembly as recited in claim 20 wherein said plurality of mate roller sections are disposed in non-fixed longitudinal positions along the length of said mate roller, each of said first predetermined spaces comprising a variable transverse dimension and each of said plurality of blades disposed and dimensioned to rotate within and occupy at least a majority of said variable transverse dimension of a corresponding one of said first predetermined spaces during concurrent rotation of said blade roller and said mate roller.

22. An assembly as recited in claim 20 wherein said out-feed assembly comprises an out-feed roller including a plurality of out-feed roller sections disposed in interacting, meat clearing relation to said plurality of blades.

23. An assembly as recited in claim 22 wherein said plurality of out-feed roller sections are rotationally disposed between corresponding, adjacently disposed ones of said plurality of blades.

24. An assembly as recited in claim 23 wherein said plurality of out-feed roller sections are transversely oriented relative to and along a length of said out-feed roller in spaced relation to one another and in off-set relation to said plurality of blades.

25. An assembly as recited in claim 22 wherein said in-feed assembly comprises an in-feed roller including a plurality of in-feed roller sections disposed in interacting relation to said plurality of blades.

26. An assembly as recited in claim 25 wherein said plurality of in-feed roller sections are rotationally disposed between corresponding, adjacently disposed ones of said plurality of blades.

27. An assembly as recited in claim 26 wherein said plurality of in-feed roller sections are transversely oriented along a length of said in-feed roller in spaced relation to one another and in off-set relation to said plurality of blades.

28. An assembly as recited in claim 20 wherein said stabilizing assembly is fixedly connected along the path of travel and comprises a plurality of prongs, each of said prongs disposed within a correspondingly disposed one of said second predetermined spaces in position stabilizing relation to said plurality of mate roller sections.

29. An assembly as recited in claim 28 wherein said stabilizing assembly comprises an elongated base fixedly connected along the length of said mate roller in transverse relation to the path of travel; said plurality of prongs fixedly connected to and extending outwardly from said base into corresponding ones of said second predetermined spaces and said position stabilizing relation to said plurality of mate roller sections.

30. An assembly as recited in claim 29 comprising said two mate segments of each of said plurality of mate roller sections fixedly connected to one another.

31. An assembly as recited in claim 20 wherein said in-feed assembly comprises an in-feed roller and a guide roller rotatable relative to one another; said out-feed roller assembly comprising an out-feed roller and a supplementary guide roller rotatable relative to one another, said supplementary guide roller rotatable at a greater predetermined rotational speed than a rotational speed of said out-feed roller, said mate roller, said in-feed roller and said guide roller.

32. An assembly as recited in claim 31 wherein said greater predetermined rotational speed of said supplementary guide roller is generally about four times the rotational speed of said out-feed roller, said mate roller, said in-feed roller and said guide roller.

* * * * *